United States Patent [19]
Mollica

[11] 3,791,058
[45] Feb. 12, 1974

[54] VISUAL EFFECT PRODUCER

[76] Inventor: Michael J. Mollica, 1435 Fayette Ave., Reading, Pa. 19607

[22] Filed: Apr. 27, 1972

[21] Appl. No.: 248,114

[52] U.S. Cl............... 40/33, 40/77, 40/106.52, 240/10.1
[51] Int. Cl............................................. G09f 11/02
[58] Field of Search ....... 40/106.52, 33, 77, 106.53; 240/10 R, 10.1, 80 C

[56] References Cited
UNITED STATES PATENTS

| | | | |
|---|---|---|---|
| 1,954,199 | 4/1934 | Fraser et al. | 240/10 R |
| 909,507 | 1/1909 | Zubli | 240/10 R |
| 3,686,781 | 8/1972 | Calhoun | 40/106.52 X |
| 571,656 | 11/1896 | Golding | 40/77 UX |
| 2,196,424 | 4/1940 | Musaphia | 40/106.52 |

Primary Examiner—Robert W. Michell
Assistant Examiner—John F. Pitrelli
Attorney, Agent, or Firm—Synnestvedt & Lechner

[57] ABSTRACT

A device for providing attractive visual effects consisting of a source of black light, a rotatable, hollow cylindrical translucent element carrying a pattern subject to fluorescence surrounding the source of black light, a stationary, hollow, cylindrical lens system having surface undulations and suitably composed of a continuous series of contiguous clear plastic rods, or rod-like portions, surrounding the rotatable patterned element and an outer housing having translucent lateral walls composed of a smoked or tinted plastic, glass or the like, the housing enclosing the elements previously referred to. Upon energization of the device, the black light causes the pattern on the rotating cylindrical element to fluoresce and the light rays thereby produced impinge upon the stationary lens system which, due to refraction of the light rays caused thereby, transmits a distorted pattern image through the translucent walls of the outer casing as the pattern rotates.

7 Claims, 7 Drawing Figures

Patented Feb. 12, 1974

VISUAL EFFECT PRODUCER

BACKGROUND OF THE INVENTION

1. Field of the Invention

The invention relates to devices which may be termed visual works of art. The devices are employed to create visual effects producing various sensations or moods in the mind of the observer.

2. Description of the Prior Art

Heretofore visual effect producers of various types have been known, as, for example, those including a source of visible light, the light source impinging its rays upon a patterned translucent film which is adapted for motion relatively to the light source. As a result, the film transmits a luminous flux which varies with the variations of the pattern. A device of the type adapted to attract attention in connection with the sale of products is disclosed in patent to Hayes U.S. Pat. No. 3,247,609. Also, it is known to provide visual effects by employing a source of ultraviolet radiant energy which is outside of the visible spectrum, but which, when impinged on various materials, causes them to fluoresce. Such radiant energy is conventionally known as "black light," which term will be hereinafter employed. The black light source is employed in conjunction with the materials subject to fluorescence by employing the materials as coatings on various objects.

SUMMARY OF THE INVENTION

A principal object of the instant invention is the provision of a visual effect producer employing a source of black light and patterned elements subject to fluorescence, the device including a lens system whereby novel effects are provided heretofore not obtainable.

In accordance with the invention, the device for producing novel visual effects includes a source of black light laterally surrounded by a trasparent film carrying a pattern subject to fluorescence under the emission of energy from the black light source. The patterned film is supported by a transparent hollow cylinder which in turn is supported on a turntable for constant rotation during the operation of the device. A stationary cylindrical lens system having surface undulations and which may be suitably composed of a continuous series of laterally connected clear plastic rods, the rods of the preferred embodiment being of circular cross section, surrounds the cylinder supporting the patterned film. Alternatively to laterally connected individual glass rods to provide the lens, it may be formed as a single element, but having the configuration of such series by an extrusion or molding process. The aforesaid parts are enclosed in a casing or housing which may be of square or circular cross section and the external lateral walls of which are made of a transparent material such as a smoked or tinted plastic or glass. The device is so constructed that a cover member of the housing by which the source of black light is supported may be easily removed to permit ready access to the patterned film for the purpose of making pattern changes.

Upon energization of the device, the cylinder supporting the patterned film is constantly rotated. The rays from the black light source impinge upon and cause the fluorescence of the pattern. As the light rays projected by the pattern impinge upon the stationary lens assembly, novel and attractive visual effects are produced. Particularly where a connected series of plastic rods of circular cross section are employed, or an extruded or molded shape is used having configuration substantially corresponding to such connected series, as in the preferred embodiment, the lens system transmits light rays cast by the pattern at the points where the pattern is in nearest contact with the rods or rod-like portions and projects the image at these points horizontally to the widths of the latter. Thus the observer sees a distortion of the actual pattern which may be termed a continuing intervaled breakdown and/or absence of the pattern. In other words, the observer sees only a small percentage of the actual pattern at any particular time.

DETAILED DESCRIPTION OF THE PREFERRED EMBODIMENTS

Figure 1:
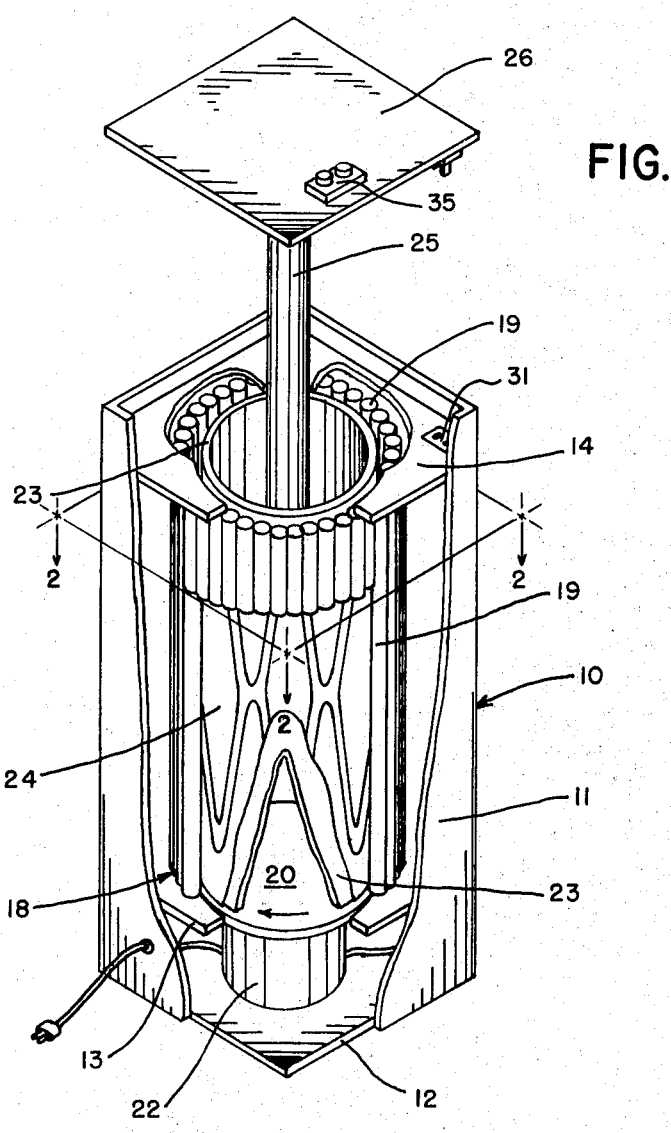
FIG. 1 is an perspective view with parts broken away for clearness of illustration, and with a cover plate partially elevated, of a visual effect producer of the instant invention.
Figure 2:
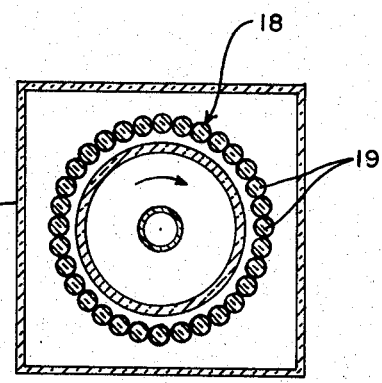
FIG. 2 is a sectional view taken on line 2—2 of FIG. 1.

Referring to the drawings, and particularly to FIGS. 1 and 2, a visual effect producer in accordance with the instant invention includes an outer housing or casing 10 having side walls consisting of translucent panels 11 formed of an acrylic plastic or the like. Alternatively, other plastics or glass may be employed. Also, while a housing of rectangular cross section is shown, it will be appreciated that it may be of circular cross section and formed as a hollow cylinder or tube, if desired. The panels 11, or the single panel defining the outer wall if a hollow cylindrical construction is used, are smoked or tinted to provide a subdued light transmission effect. A bottom panel 12 is employed to close the lower end of the housing. Partition walls 13 and 14 are provided adjacent but spaced from the lower and upper ends of the housing respectively. The partition walls 13 and 14 are centrally apertured for purposes to be described. The several elements referred to above are suitably bonded at their lines of contact with one another by an adhesive or, where a plastic is employed, by a heat-seal or by an integral bond obtained by applying a solvent for the plastic to adjoining parts. Alternatively, the housing can be cast as by an injection molding process in, for example, two halves and the halves joined together as by any of the methods noted above.

A lens system 18 of tubular configuration is supported by the lower partition plate 13, the lens system in the preferred embodiment of the invention illustrated in FIG. 1 consisting of a continuous series of vertically extending rods 19 of circular cross section. The rods are suitably formed of a clear plastic such as an acrylic or styrene plastic. Each of the rods is suitably joined to adjacent rods at their lines of tangency by a heat seal, by an adhesive, by welding the rods together by the use of a suitable solvent, or by other suitable means. Alternatively, the lens may be formed as a single unit in the shape of the series of bonded rods by an extrusion or injection molding process or the like.

A turnable 20 mounted on and supported by the shaft of an electric motor 22 (FIGS. 1 and 4) is positioned within the aperture in the lower partition of the panel 13, the motor 22 resting on and being secured to lower end wall 12 of the housing. The turntable-driving motor combination may be of any suitable commercial type, the motor being adapted to be operated by a normal electric house circuit such as a 115-volt, 60-cycle circuit. The motor includes speed reduction gearing (not shown) to produce a rate of rotation of the turnable preferably of the order of 2 rpm; however, higher or lower speeds can be employed, if desired.

A hollow cylindrical or tubular element 23 has its lower end resting on turntable 20, the element 23 extending to partition 14 adjacent the upper end of the unit. Element 23 is formed of a clear, transparent or translucent material, suitably a plastic such as an acrylic or styrene plastic. The tubular element 23 supports a flexible patterned sheet or film 24 which is wrapped around element 23 and has its ends temporarily secured together by any suitable means such as a transparent adhesive tape. Alternatively, the patterned film may be inserted inside the cylindrical element, if desired, to lie adjacent the wall thereof. In such case, the necessity of securing the ends of the sheet together is eliminated.

Figure 3:
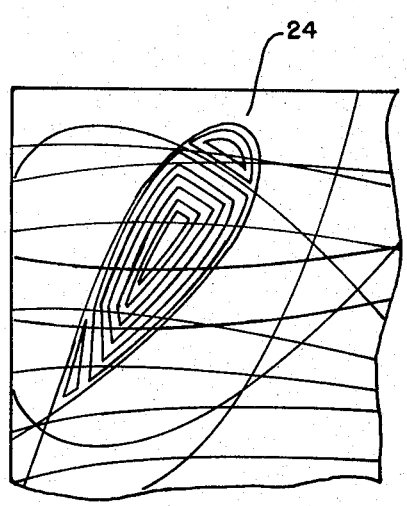
FIG. 3 is a plan view of a portion of a pattern element which may be employed in the instant invention.

Patterned sheet or film 24 is composed of a translucent flexible material such as an acetate plastic. The sheet on either its inner or outer surface carries a pattern which may be of any desired configuration and color or combination of colors, the pattern being formed suitably by a silk screening process employing pigmented materials of any of the known or other types which are subject to fluorescence upon the impingement thereon of black light rays. For example, lacquer, oil, acrylic or water-base nonradioactive phosphorescent compounds may be employed. A relatively simple pattern is illustrated in FIG. 1, but, as indicated above, any desired pattern may be used to obtain a desired visual effect or mood. For example, a more intricate pattern may be employed as illustrated in FIG. 3 where what may be termed a swirl pattern involving overlapping pigmentations of the type subject to fluorescence upon the impingement thereon of black light is shown.

A conventional source of black light, such as black light tube 25, is carried by a cover element 26, the latter being formed preferably of an opaque material such as an opaque acrylic resin. The cover 26 is dimensioned to be inserted within the outer walls of the housing 10 where it rests upon the upper partition 14 when the cover member is assembled with the housing. The black light tube is supported from the cover by having the contacts 27 on its upper end plugged into a plug 28 (see FIG. 4) which in turn is mounted in any suitable manner on the underside of the cover member centrally thereof.

Figure 4:
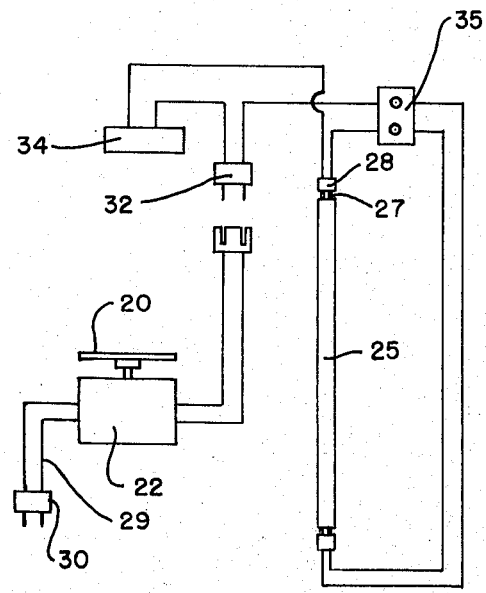
FIG. 4 is a diagramatic view illustrating the electrical circuitry employed in the device of the invention.

Referring now particularly to FIG. 4, motor 22 is connected by leads 29 to a plug 30 adapted to be plugged into a wall receptable or the like of a normal house circuit such as a 115-volt, 60-cycle circuit, as previously mentioned. The leads extend from the motor to a socket 31 mounted on the upper partition member 14 (see FIG. 1). The circuitry for the black light tube 25 includes a plug 32 adapted to be plugged into socket 31, a ballast or transformer 34 such as an 8-watt, 60-cycle fluorescent lamp balance, and an off-on switch 35, the switch being mounted on the cover member 26 as shown in FIG. 1, and the necessary leads for connecting the several elements of the black light system. As will be understood, all of such elements, starting with the plug 32 and the connecting leads, are supported from cover member 26. Consequently, when the cover is removed, tubular member 23 carrying the patterned film 24 may be readily lifted from the housing to permit the changing of the patterned sheet or film 24 when it is mounted to surround the exterior of the tubular member. On the other hand, if the patterned sheet or film 24 is employed interiorly of the tubular member, it may be changed without even the need for removing the tubular member from the housing.

In the operation of the preferred embodiment of the visual effect producer described above, cover member 26 is lifted from the casing 10, thereby disconnecting plug 32 from socket 31. As previously mentioned, the lifting or removing of the cover results in the removal of the black light tube 25 and its associated elements from the interior of tubular member 23. The latter may then be removed endwise from the housing and a sheet or film 24 having the desired pattern wrapped and secured thereon. Alternatively, as mentioned above, the pattern sheet or film is placed interiorly of the tubular member, this may be done without the necessity of removing the latter. The cover member 26 is then restored to its position on the housing with black light tube 25 projecting into the interior of tubular element 23 and with the contacts of plug 32 inserted in socket 31. Plug 30 is then plugged into a house circuit or other electrical circuit, thereby energizing motor 22. Upon closing switch 35, the black light tube is energized and the rays cast thereby penetrate rotating tubular element 23 and the patterned sheet or film 24 carried thereby, causing fluorescence of the pattern. The rays impinge upon lens system 18 which, as previously noted, transmits the rays at the points where the pattern is in nearest contact therewith and projects the image at those points horizontally to the width of the rods or rod-like portions of the lens system. As a result, the observer sees a distortion of the actual pattern.

Figure 5:
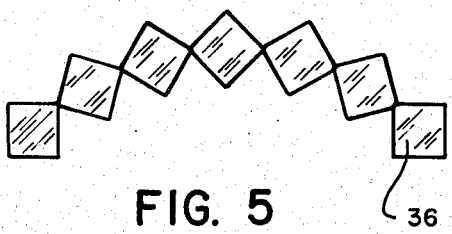
FIG. 5 is an end view of a portion of an alternative lens system for employment in the device of FIG. 1.
Figure 6:
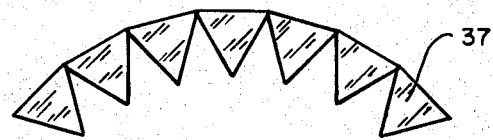
FIG. 6 is a top plan view of a portion of a second alternative lens system.
Figure 7:
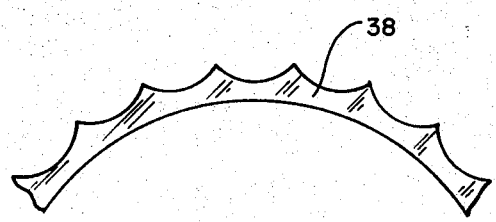
FIG. 7 is a top plan view of a portion of a third alternative lens system.

Referring now particularly to FIGS. 5, 6 and 7, three variations in the construction of the lens system are illustrated, but it will be understood that other variations may be used to obtain different effects. In the embodiment of FIG. 5, the rods or rod-like portions 36 which are suitably made from a clear acrylic plastic, as is the case of the rods or rod-like portions 18 of FIG. 1, are square rather than circular in cross section and adjacent rods or rod-like portions are suitabley joined together or integrally bonded at opposite corners. In the embodiment of FIG. 6, rods or rod-like portions 37 of triangular cross section are employed, the rods again being formed of a clear plastic such as an acrylic plastic. As will be noted, the rods are positioned so that apexes thereof point towards the center of the assembly. Again, individual rods may be secured in assembled relationship as by heat-sealing, an adhesive, the application of a solvent for the particular plastic employed to the contacting portions, or the like. Also, as in the embodiment of FIG. 1, the lens systems of FIGS.

5 and 6 may be formed by an extrusion or injection molding process to provide the continuous series of rod-like portions. In the embodiment of FIG. 7, an annular element 38 is provided which may be suitably formed as, for example, by extrusion. The lens as shown has an inner surface of cylindrical configuration and an outer undulated surface. However, a reversal may be employed in which the inner surface may be the undulated surface, or both surfaces may be so constructed.

As will be appreciated, the lens systems of FIGS. 5 to 7, while producing different effects as compared to the lens system of the preferred embodiment of FIG. 1, will, due to the refraction of the light rays transmitted thereby, also produce distorted pattern images.

While the preferred embodiment of the invention has been disclosed above, this embodiment employing a black light source 25 and a film 24 carrying pigmentation subject to fluorescence on the impingement of black light rays, these features are not essential to the attainment of many of the advantages of the invention. Thus, in lieu of the black light tube, sources of visible light such as ordinary incandescent light bulbs or tubes, mercury vapor tubes and other light sources of various brightnesses, hues and colors may be used. Also, the intensity of light emitted by the light source may be maintained constant during the operation of the visual effect producer or may, by any suitable or conventional means, be caused to flicker or blink on and off or the like. Where visible light rather than black light is employed as the light source, the sheet or film 24 may carry various patterns formed by any translucent pigmented materials of the desired colors.

Although certain embodiments of the invention have been shown in the drawings and described in the specification, it is to be understood that the invention is not limited thereto, is capable of modification, and can be rearranged without departing from the spirit and scope of the invention.

I claim:

1. In a visual effect producer comprising a light source, a patterning means laterally surrounding said light source and a transparent lens system, said patterning means and said lens system being positioned in the path of light rays from said light source with said patterning means interposed between said lens system and said light source, and means for moving said patterning means relatively to said light source and said lens system to expose successive portions of said patterning means to light rays of said light source at any given location on said lens system, the improvement wherein said light source is an electric light tube and there is an electric circuit therefor including a plurality of elements, there is a laterally translucent housing enclosing said light tube, patterning means and lens system, said housing including a cover member overlying said patterning means and means supporting said cover member for ready removal and replacement thereof, there is means supporting said light tube and certain said elements of said electrical circuit from said cover member, there is disconnectable cooperating means on said cover member and said cover member supporting means respectively connecting said certain elements of said electric circuit to other elements thereof when said cover member is supported by said cover member supporting means, whereby upon removal of said cover member from said cover member supporting means, said disconnectable means are disconnected and said light tube and the elements of said electrical circuit supported by said cover member may be moved with said cover member to a remote location to permit ready access to said patterning means.

2. A visual effect producer as defined in claim 1 wherein said patterning means and said lens system are each of tubular configuration and the means for moving said patterning means comprises means for rotating the same relatively to the lens system, said last-named means comprising a turntable on which said patterning means is positioned, an electric motor for rotating said turntable and means connecting said motor into said electric circuit.

3. A visual effect producer as defined in claim 2 wherein said lens system comprises a transparent tube having a convoluted surface.

4. A visual effect producer as defined in claim 1 wherein said lens system is comprised of a series of transparent rod-like portions extending at an angle to the direction of movement of said patterning means.

5. A visual effect producer as defined in claim 4 wherein said rod-like portions of said lens system are substantially square in cross section.

6. A visual effect producer as defined in claim 4 wherein said rod-like portions of said lens system are substantially triangular in cross section.

7. A visual effect producer as defined in claim 1 wherein said light tube is a black light tube and there is a pattern carried by said patterning means which is of a character to be subject to fluorescence by said black light tube.

* * * * *